United States Patent
Harres et al.

(10) Patent No.: US 6,862,397 B2
(45) Date of Patent: Mar. 1, 2005

(54) METHOD FOR AUDIBLY MEASURING OPTICAL EFFICIENCY IN AN INSTALLED FIBER OPTIC LINK

(75) Inventors: Daniel N. Harres, Belleville, IL (US); Samuel I. Green, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 10/270,996

(22) Filed: Oct. 15, 2002

(65) Prior Publication Data

US 2004/0071438 A1 Apr. 15, 2004

(51) Int. Cl.[7] ................................................ G02B 6/00
(52) U.S. Cl. ...................... 385/147; 385/147; 385/12; 385/24; 385/53; 385/52; 385/100; 250/227.11
(58) Field of Search ............................. 385/12, 24, 52, 385/53, 100, 147; 250/227.11, 227.24

(56) References Cited

U.S. PATENT DOCUMENTS

| | | | | |
|---|---|---|---|---|
| 4,339,658 A | * | 7/1982 | Fromm et al. | 250/227.24 |
| 4,708,422 A | * | 11/1987 | Arnoux et al. | 398/14 |
| 4,800,265 A | * | 1/1989 | Marzari et al. | 356/73.1 |
| 4,807,147 A | * | 2/1989 | Halbert et al. | 702/66 |
| 5,142,600 A | * | 8/1992 | Ortiz, Jr. | 385/83 |
| 5,196,899 A | * | 3/1993 | Serwatka | 356/73.1 |
| 5,450,508 A | * | 9/1995 | Decusatis et al. | 385/25 |
| 5,455,536 A | * | 10/1995 | Kono et al. | 329/325 |
| 5,729,335 A | | 3/1998 | Green | |
| 6,195,768 B1 | | 2/2001 | Green | |
| 6,334,007 B1 | * | 12/2001 | Clark | 385/12 |
| 6,490,378 B2 | | 12/2002 | Walter et al. | |
| 6,748,141 B2 | * | 6/2004 | Kennedy et al. | 385/49 |
| 2002/0159556 A1 | * | 10/2002 | Kishine et al. | 375/376 |
| 2003/0198424 A1 | * | 10/2003 | Bennett | 385/12 |
| 2004/0170360 A1 | * | 9/2004 | Kennedy et al. | 385/52 |

OTHER PUBLICATIONS

Bit error rate test accessory makes errors audible, vol. 72, No. 12, Dec. 2001 by Samuel I. Green, pp 4472–4473.
U.S. Appl. No. 10/061,517, filed Jan. 31, 2002, title : Built–In Test Signal Attenuation Circuit, Iventor Daniel Harres.

* cited by examiner

Primary Examiner—Karl D. Frech
Assistant Examiner—Daniel Walsh
(74) Attorney, Agent, or Firm—Harness Dickey & Pierce P.L.C.

(57) ABSTRACT

A method for introducing errors into a digital fiber optic communication link so that small analog changes in optical transmission efficiency can be determined by changes in the audible error rate. The method comprises providing a transmitter with a test channel that provides a pseudorandom encoded optical transmission through coupled fiber optic cables. The signal is sent through the cables and received by a receiver which introduces and measures errors. The received signal is split and processed by a clock recovery circuit and a lowpass filter. The clock recovery circuit obtains the optimal sampling point. The lowpass filter filters the data and provides a timing adjustment relative to the recovered clock signal. The clock retimes the filtered data with a sampling comparator. The variable timing introduces errors allowing optical transmission efficiency measurements. A bit error rate tester produces audible sounds whose frequency content is related to the bit error rate. Optimal transmission efficiency is determined by manipulating the cables and their associated ferrules until the audible sounds have the lowest frequencies.

26 Claims, 3 Drawing Sheets

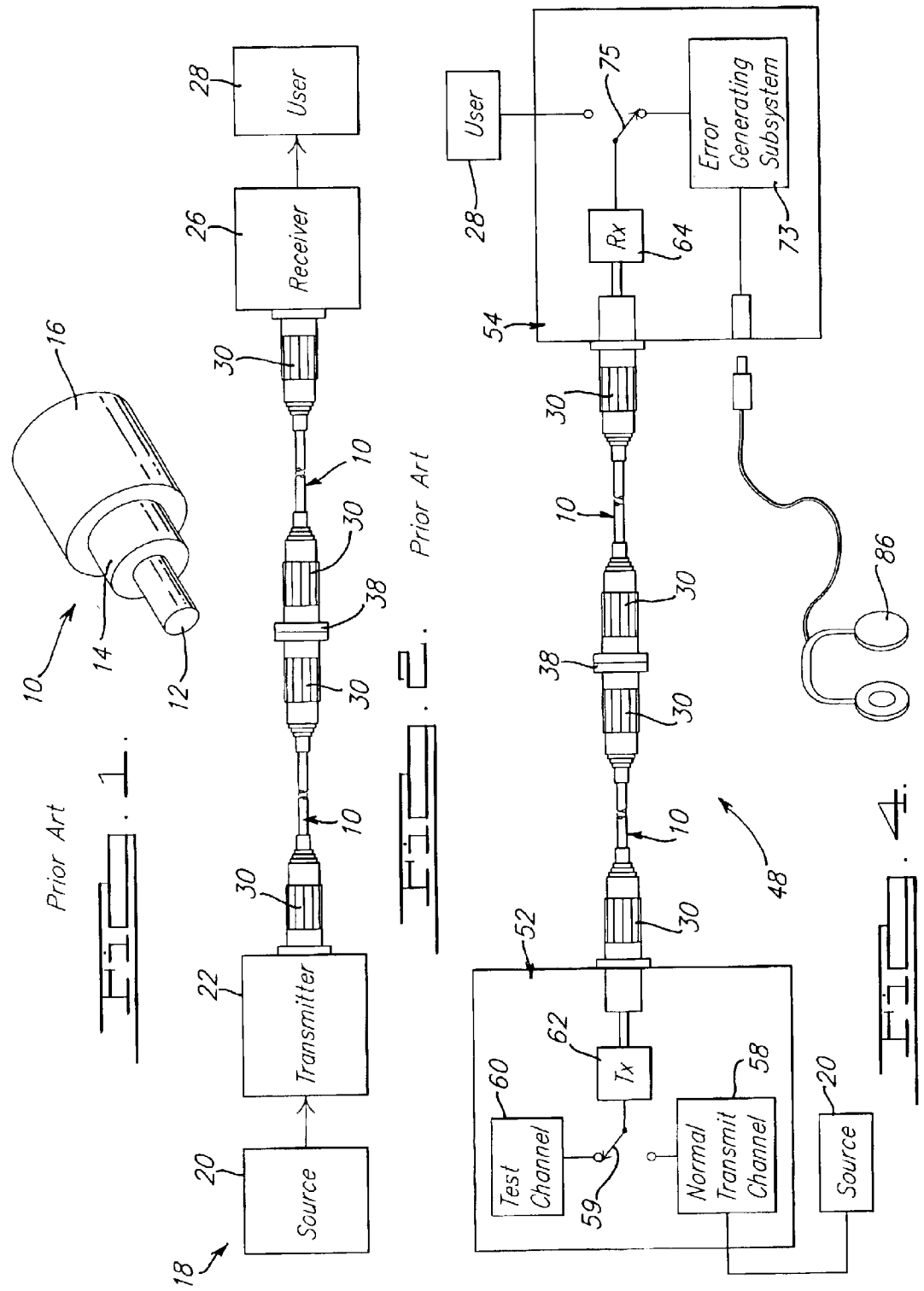

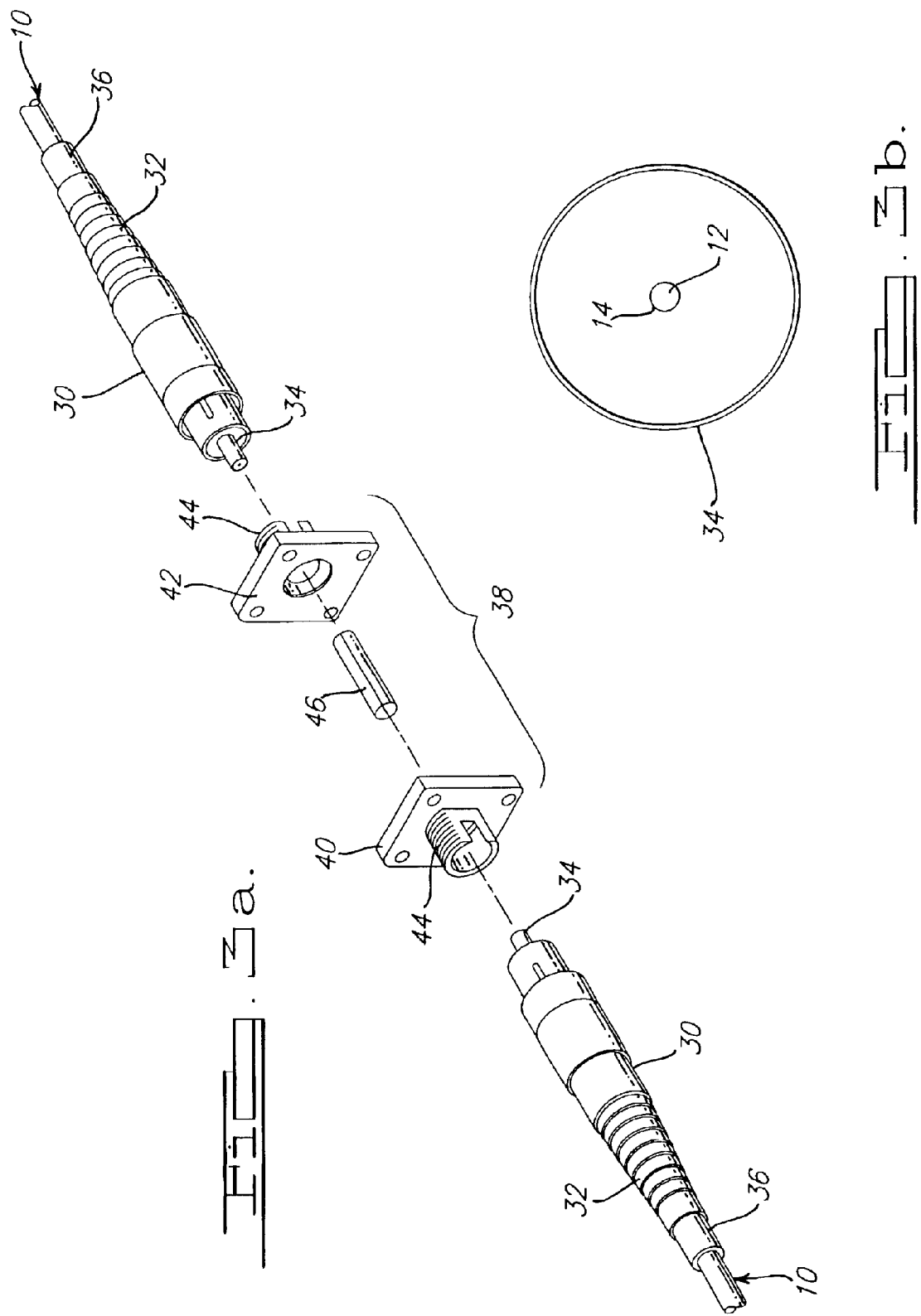

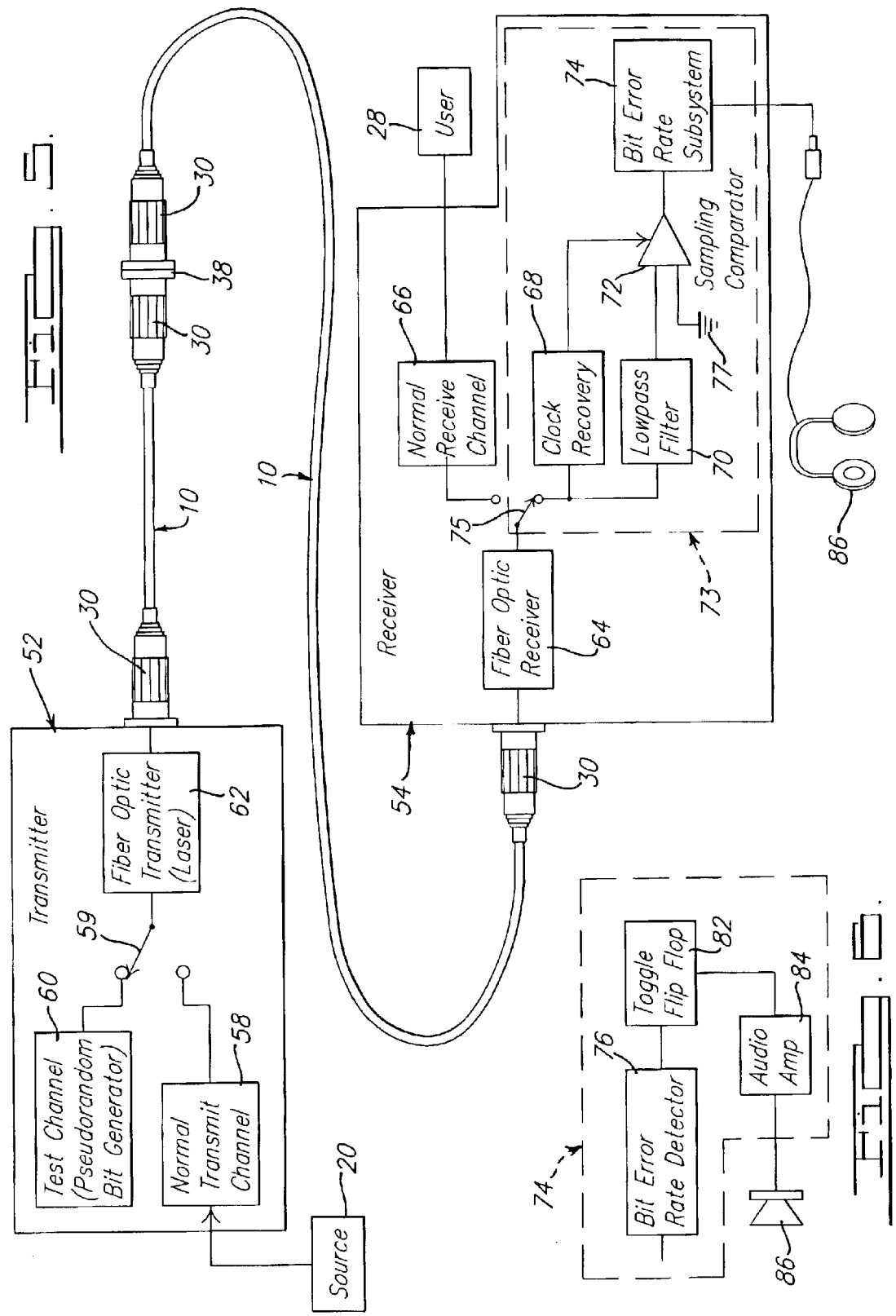

METHOD FOR AUDIBLY MEASURING OPTICAL EFFICIENCY IN AN INSTALLED FIBER OPTIC LINK

CROSS-REFERENCE TO RELATED APPLICATIONS

This application is related to U.S. patent application Ser. No. 10/061,517 filed on Jan. 31, 2002. The disclosure of the above application is incorporated herein by reference.

FIELD OF THE INVENTION

The present invention generally relates to fiber optics. In particular, the present invention relates to a method for determining the optical transmission quality of an installed fiber optic link.

BACKGROUND OF THE INVENTION

Fiber optic cable is a common type of cabling used to transmit optical data from one location to another. Fiber optic cable is generally comprised of either glass, a combination of glass and polymers, or just polymers (plastic optical fibers). Fiber optic cable is fabricated in such a way that it can conduct a beam of light from one end of the cable to another.

A typical fiber optic cable 10 is illustrated in FIG. 1. As seen in FIG. 1, fiber optic cable 10 is generally comprised of a core 12, cladding 14, and buffer/outer jacket 16. The core 12 is a very narrow strand of high quality glass and is carried through the cable 10 by way of the cladding 14. The cladding 14 is also made of high quality glass but has a slightly lower index of refraction than the core, usually within 1–2%. Thus, if the light injected into the core 12 strikes cladding 14 the light is reflected back into the core 12 so as to continue down the cable 10. The jacket 16 acts as a shock absorber to protect core 12 and cladding 14 from shocks that might affect their physical properties. Further, jacket 16 protects the cable 10 from abrasions, solvents, and other contaminants. Jacket 14 does not have any optical properties that might affect the propagation of light within the cable 10.

A typical prior art fiber optic data link is illustrated generally at 18 in FIG. 2. The data link 18 generally comprises a source 20, a transmitter 22, one or more fiber optic cables 10, a receiver 26, and an end user 28. Source 20 provides data to the transmitter 22 in the form a digital electrical signal. The transmitter 22 acts as a transducer and converts the digital electrical signal into an optical signal. The transmitter 22 comprises a light source for transmitting the optical signal through the fiber optic cable 10. The transmitter 22 modulates the light so as to represent the binary data it receives from source 20. The receiver 26 has two functions. First, receiver 26 senses or detects light from the fiber optic cable 10 and then converts the light into an electrical signal. Second, receiver 26 demodulates this light to determine the data that it represents. The receiver 26 then transmits the binary data to the user in the form of an electrical signal.

The fiber optic cable 10 is mated to the transmitter 22 and receiver 26 by connectors 30. Each connector 30 is comprised of a main body 32, a ferrule 34, and an aperture 36. At the terminus of cable 10, all layers of cable 10 are stripped away except for core 12, cladding 14, and sometimes the protective buffer coating 16. The cable 10 is then inserted within aperture 36 of main body 32 until the stripped end of the cable 10 extends through ferrule 34.

Further, as seen in FIG. 3, the connectors 30 of one or more cables 10 may be linked so as to increase the distance between transmitter 22 and receiver 26. The mating of each connector 30 is provided by adaptor housing 38. Adaptor housing 38 is comprised of a first half 40 and a second half 42. The halves 40, 42 each have apertures 44 to secure each connector 30 to opposite sides of adaptor 38.

To provide optimum optical transmission performance between connectors 30 when two or more cables 10 are linked, the cores 12 of each cable 10 must be precisely aligned co-axially. To aid in the co-axial alignment of the cores 12, the ferrules 34 are typically placed within alignment sleeve 46. Alignment sleeve 46 is a cylinder-like metal or ceramic device that mechanically clasps an outside diameter of the ferrules 34 to bring the ferrules 34 into co-axial alignment.

Precise co-axial alignment of cores 12 using housing 38 and alignment sleeve 46 can only be achieved if the cores 12 of both cables 10 are precisely centered within each ferrule 34. If the cores 12 are not centered then the cores 12 will not be aligned even if the ferrules 34 are aligned and optical transmission loss is experienced as light is unable to travel uninterrupted between connectors 30.

In a lab setting, precise co-axial alignment of cores 12 is easily achieved. Specifically, the cables 10 are disconnected from transmitter 22 and receiver 26 to allow a continuous wave of light to be inserted through the cables 10. The light output is measured by a suitable optical power meter as it passes through the connectors 30 associated with adaptor housing 38. As the output is measured, the cable 10 or cable/ferrule 10/34 is rotated. When the highest level of optical power is recorded by the power meter, rotation is stopped and the positions of the cables 10 are locked in place using any suitable device, such as a locking connector.

The above described technique for determining the precise co-axial alignment of the cores 12 requires that connectors 30 of cables 10 be removed from transmitter 22 and receiver 26. Consequently the method is only suitable for laboratory use and not for field use because removing cables 10 will likely cause the cables 10 to be damaged due to the infiltration of foreign materials. Specifically, in stressful repair scenarios, such as on an aircraft carrier deck, the cables 10 may be damaged by salt spray, grease, or other substances harmful to optical fibers.

Thus, there exists a need for a method capable of determining the precise co-axial alignment of fiber optic cores 12, and maximum optical transmission performance, without having to disconnect the fiber optic cables 10 and expose the connections 30 to the atmosphere, thus risking performance degradation due to the infiltration of foreign elements, such as dust and dirt.

SUMMARY OF THE INVENTION

The present invention overcomes the deficiencies of the prior art by providing a method for optimizing the optical transmission efficiency of a fiber optic connection without having to disconnect the fiber optic connections. The method comprises providing a transmitter that produces a signal that is degraded following transmission through two coupled fiber optic cables that are to be optimized. The received signal is processed by a clock recovery circuit, a lowpass filter, and a retiming circuit. The clock recovery circuit obtains a recovered clock signal and the lowpass filter filters and delays recovered data transmitted through the fiber optic connection. A sampling comparator, such as the industry standard AM685 microcircuit, digitizes and retimes the recovered data signal from the lowpass filter using the recovered clock signal from the clock recovery circuit. The variable delay of the lowpass filter is used to adjust the retiming to a less than optimal delay value as a means of introducing a controlled error rate. The output of the sampling comparator represents a degraded signal having errors that can be analyzed by the bit error rate subsystem. The bit error rate subsystem produces error pulses that are subsequently converted to audible sounds. The frequencies present in the sounds are representative of and proportional to the rate of data transmission errors. Optimal transmission efficiency is determined by manipulating the cables, and their associated ferrules, until the error signals occur least frequently and the audio frequencies are lowest, thus indicating that the optical connection is optimized. Thus, the present invention provides a method for introducing errors into a digital fiber optic communication link so that small analog changes in optical transmission efficiency can be determined by changes in the audible error rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a cross-sectional perspective view of a fiber optic cable;

FIG. 2 is a block diagram illustrating a prior art fiber optic data link;

FIG. 3a is a diagram illustrating a connection between two fiber optic cables;

FIG. 3b is an end view of a connector of the fiber optic connection of FIG. 3a;

FIG. 4 is a block diagram illustrating the fiber optic data link of the present invention;

FIG. 5 is a block diagram of a transmitter and a receiver of FIG. 4; and

FIG. 6 is a block diagram of a bit error rate subsystem and audio generator of FIG. 5.

DETAILED DESCRIPTION OF THE PREFERRED EMBODIMENTS

The following description of the preferred embodiment is merely exemplary in nature and is in no way intended to limit the invention, its application, or uses.

The present invention, in one preferred embodiment, relates to a data link 48 as shown in FIG. 4. The data link 48 generally includes a source 20, a transmitter 52, and a receiver 54. A user 28 receives an output of the receiver 54. The transmitter 52 is generally comprised of a normal transmit channel 58, a test channel 60, and a fiber optic transmitter (e.g. laser or LED) 62. The receiver 54 is generally comprised of a fiber optic receiver 64 and an error generating subsystem 73.

The fiber optic cables 10 are connected by connectors 30 using any suitable method or device, such as housing 38 and alignment sleeve 46, in the conventional manner. The data link 48 provides analog signal measurement to enable the user 28 to audibly adjust the coupling of the optical cables 10 to maximize the efficiency of the coupling thereof. While the data link 48 is illustrated and described as employing the use of fiber optic cables 10, it must be realized that any suitable optical transmission device may be used.

FIG. 5 provides a more detailed view of the transmitter 52 and the receiver 54 of the present invention. As described above, the transmitter 52 comprises a normal transmit channel 58, a test channel (pseudo-random bit stream generator) 60, and a fiber optic transmitter (e.g., laser or LED) 62. When the transmitter 52 is set at the normal transmit channel 58 using switch 59, the transmitter 52 functions in the same manner as the prior art in that it transforms the digital data received into modulated light for transmission by laser 62 through fiber optic cable 10.

When transmitter 52 is set to test channel 60 using switch 59 as illustrated in FIGS. 4 and 5, a pseudo-random bit stream generator of the test channel 60 produces a sequence of bits, such as a maximal length pseudorandom code of length $2^n-1$, or a simpler sequence such as a 10101 . . . pattern.

The receiver 54 includes a fiber optic receiver 64, a normal receive channel 66, and an error generating subsystem 73. The error generating subsystem 73 is comprised of a clock recovery circuit 68, a lowpass filter 70, a sampling comparator 72, bit error rate (BER) subsystem 74 (described in further detail below and in FIG. 6), and a ground reference input 77. If the normal transmit channel 58 is selected using switch 75, the fiber optic receiver 64 and the normal receive channel 66 detect and decode the light signal to reproduce the electrical data signal that the light signal represents and delivers it to the user 28.

If test channel 60 is selected using switch 59 and the error generating subsystem is selected using switch 75, as is illustrated in FIG. 5, the electrical signal is not sent to the user 28 but is instead compared to an expected code sequence and sampled for errors. The signal is simultaneously received by both clock recovery circuit 68 and lowpass filter 70. The clock recovery circuit 68 identifies the optimal sampling point of the unfiltered waveform output by the fiber optic receiver 64 and generates a recovered clock signal as its output signal. The lowpass filter 70 generates a filtered and delayed version of the recovered data signal from the fiber optic receiver's 64 output.

More specifically, the lowpass filter 70 serves two functions. First, lowpass filter 70 provides a "rounding" of what might otherwise be a digital waveform with fairly sharp edges. This rounding provides a gradual change in signal-to-noise of the signal input into the lowpass filter 70. Second, by making the pole of the lowpass filter 70 variable, an adjustable phase shift is introduced into the lowpass filter 70 output signal, thus providing necessary timing adjustment.

Sampling comparator 72 digitizes and retimes the recovered data signal from the lowpass filter 70 using the recovered clock signal from clock recovery circuit 68. The variable delay of the lowpass filter 70 is used to adjust the retiming to a less than optimal delay value as a means of introducing a controlled error rate. The output of the sampling comparator 72 represents a degraded signal having errors that can be analyzed by the bit error rate (BER) subsystem 74.

The BER subsystem 74 is shown in greater detail in FIG. 6. The BER subsystem 74 includes a bit error detector 76 that generates a narrow error pulse each time an error is detected. Each narrow error pulse toggles a flip-flop 82. As the flip-flop 82 is toggled, an electrical signal rich in audible components is produced. As more errors are detected, the flip-flop 82 changes state with a higher frequency. This exemplary method for making narrow error pulses audible is explained in further detail in "Bit Error Rate Test Accessory Makes Errors Audible" by Samuel I. Green, *Review of Scientific Instruments*, Vol. 2, No.12, which is hereby incorporated by reference.

The audible error signal is amplified by audio amplifier 84 and sent to an electrical to audio transducer 86, the transducer 86 being in the form of either a loudspeaker or headphones. The audible signal is in the form of "clicks" representing each error, sounding much like a Geiger counter at low to moderate error rates. At high error rates, the randomness of error occurrences gives a white noise sound with frequency components so that the human ear can readily discern between higher and lower errors, even at error rates far above the normally audible frequency region. The frequency of the audible tones decreases as the frequency of errors decreases due to increases in the efficiency of the coupling provided by the optical link and the subsequently lower BER.

By listening to the audible tone, a technician may position cables 10 to optimize the co-axial alignment of the two cores 12 of cables 10. For example, as the technician manipulates the two cables 10, such as through manual rotation of the fiber optic cables 10 or through rotation of ferrules 34, the positions of the cores 12 vary relative to each other. If the manipulation misaligns the cores 12, the number of transmission errors increases and the audible tone becomes higher in frequency. In contrast, if the manipulation aligns the cores 12, the number of transmission errors decreases and the audible tone frequency decreases to a minimum frequency. Thus, by manipulating the cables 10 and ferrules 34 and locking them in place at the point that the audible tone frequency is at a minimum, the technician can insure optimal co-axial alignment of cores 12 and optimum optical transmission efficiency.

The method of the present invention for measuring optical efficiency is advantageous as it allows the technician to determine, without completely disconnecting connector 30, which orientation of ferrule 34 within the connector 30 being adjusted produces the lowest transmission loss. This method may also be used as a built-in test to determine the signal relative to a standard level, to determine, for example, whether a link is optimized for performance.

Thus, a method for optimizing the optical transmission efficiency of a fiber optic connection is disclosed. The method comprises using test channel 60 of transmitter 52 to transmit data through two coupled fiber optic cables 10. The signal passes through the coupled cables 10 and is received by receiver 54 where the signal quality is adjustably degraded and then tested for transmission errors. The received signal is simultaneously processed by clock recovery circuit 68 and lowpass filter 70. Clock recovery circuit 68 provides a recovered reference clock signal. Lowpass filter 70 provides a filtered or delayed recovered data signal. The sampling comparator 72 digitizes and retimes the recovered data signal from the lowpass filter 70 using the recovered clock signal from the recovery circuit 68. The variable delay of the lowpass filter 70 is used to adjust the retiming to a less than optimal delay value as a means of introducing a controlled error rate. The output of the sampling comparator 72 represents a degraded signal having errors that can be analyzed by the bit error rate subsystem 74.

The BER detector 76 receives the signal from the sampling comparator 72 and produces narrow error pulses that have very little audible content. These narrow pulses trigger a toggle flip-flop 82 whose output alternates states for each error pulse input, providing an electrical signal rich in audible content. The resulting signal drives an audio amplifier 84 and a transducer 86 in the form of either a loudspeaker or headphones to provide audible sounds in the form of clicks representing each error, sounding much like a Geiger counter at low to moderate error rates. At high error rates, the randomness of error occurrences gives a white noise sound with frequency components so that the human ear can readily discern between higher and lower errors, even at error rates far above the normally audible frequency region. Without having to disconnect cables 10, optimal transmission efficiency can be determined by manipulating cables 10 and ferrules 34 until the sounds occur less frequently, thus indicating that the cores 12 of each cable 10 are aligned and that the optical connection between transmitter 22 and receiver 26 is optimized. Once the connection is optimized, the cores 12 are secured into position.

The present invention thus provides a method for optimizing the optical transmission efficiency of a fiber optic connection without having to fully disconnect fiber optic connectors 30. Consequently, the possibility that connectors 30 may be corrupted by foreign substances, such as grease or salt spray of an aircraft carrier deck, when disconnected for testing is eliminated.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for optimizing the efficiency of a connection between a pair of optical elements coupled by a connector, comprising:

applying a signal to said optical elements;

receiving said signal using a receiver that is remote to said connection between said optical elements;

detecting one or more errors in said signal using said receiver, said errors caused by coaxial misalignment of said optical elements at said connector;

causing an audible error signal to be generated, said audible error signal changing in response to one of an increase and decrease in said error; and using said audible error signal to physically position said optical elements relative to each other such that coaxial misalignment of said optical elements is at least reduced.

2. The method of claim 1, wherein said optical elements comprise fiber optic cables.

3. The method of claim 1, wherein said audible signal changes in frequency in response to said one of an increase and decrease in said errors.

4. The method of claim 1, further comprising:

recovering a clock signal using a recovery circuit;

recovering a data signal using a lowpass filter;

using a sampling comparator to digitize and retime said recovered data signal using said recovered clock signal; and using a variable delay of said lowpass filter to adjust said retiming of said recovered data signal to a less than optimal delay value for introducing a controlled error rate;

wherein said error rate represents said errors caused by said coaxial misalignment of said optical elements.

5. The method of claim 1, further comprising using a bit error rate subsystem to generate said audible error signal, said bit error rate subsystem comprising:
   generating a narrow error pulse in response to each said error; and
   using each said narrow error pulse to toggle a flip-flop that produces an electrical signal including errors indicative of said coaxial misalignment.

6. A method for optimizing the optical efficiency of a fiber optic connection comprising:
   using a transmitter to transmit a signal through at least two fiber optic cables linked by a connector assembly;
   receiving said signal using a receiver;
   processing said signal to obtain a recovered clock signal;
   processing said signal to obtain a filtered or delayed recovered data signal;
   using said recovered clock signal to digitize and retime said recovered data signal;
   using a variable delay to adjust said retimed recovered data to a less than optimal delay value to introduce errors into said signal;
   generating audible signals representative of said errors;
   manipulating said fiber optic cables and said connectors to determine, using said audible signals, a position at which said bit error rate degradation is minimized, and
   securing said cables and said connectors in said position.

7. The method of claim 6, wherein said position at which said errors occur least frequently is a point where said fiber optic cables are in substantial co-axial alignment.

8. The method of claim 6, wherein said connectors are linked using an adaptor.

9. The method of claim 6, wherein said connectors are linked using an alignment sleeve.

10. The method of claim 6, wherein said recovered clock signal is obtained using a clock recovery circuit.

11. The method of claim 6, wherein said filtered or delayed recovered data signal is produced using a lowpass filter.

12. The method of claim 6, wherein said step of using said recovered clock signal to digitize and retime said recovered data signal is performed using a sampling comparator.

13. The method of claim 6, wherein said variable delay is provided by a lowpass filter.

14. A fiber optic data link for optimizing the optical efficiency of a fiber optic connection comprising:
   a transmitter connected to a receiver by way of at least two fiber optic cables coupled by at least one connector;
   said transmitter being operable to send an encoded data signal through said cables;
   said receiver located remotely from said connector and operable to receive said signal and to produce an audible tone in response to the measurement and detection of transmission errors produced as a result of said connector; and
   wherein at least one of said cables is manipulated relative to said connector in response to said audible tone, to locate a position at which said optical efficiency of said fiber optic connection is maximized as indicated by changes in said audible tone.

15. The data link of claim 14, wherein said transmitter includes a test channel for generating said transmission errors.

16. The data link of claim 14, wherein said receiver further comprises a clock recovery circuit for recovering a clock signal.

17. The data link of claim 14, further comprising a lowpass filter for adjustably delaying a recovered data signal.

18. The data link of claim 14, further comprising a sampling comparator for digitizing and retiming a recovered data signal generated by a lowpass filter using a recovered clock signal from a clock recovery circuit.

19. The data link of claim 18, further comprising a variable delay of said lowpass filter for adjusting said retiming to a less than optimal delay value for introducing a controlled error rate.

20. The data link of claim 14, wherein said audible tone is produced by a bit error rate subsystem, said bit error rate subsystem comprising:
   a bit error rate detector for generating a narrow error pulse as said errors are detected; and
   a flip-flop that is toggled in response to receipt of each narrow error pulse for producing an electrical signal that is rich in audible components.

21. The data link of claim 14, wherein said position at which said fiber optic connection is maximized is a point where cores of said fiber optic cables are in substantial co-axial alignment.

22. A fiber optic data link for optimizing the optical efficiency of an optical connection between a pair of optical elements, comprising:
   a transmitter for transmitting an optical signal and a receiver for receiving an optical signal, said transmitter connected to said receiver by way of at least two fiber optic cables coupled by connectors;
   said transmitter comprising a test channel for introducing an encoded optical signal;
   said receiver comprising a clock recovery circuit for processing said encoded optical signal to obtain a recovered clock signal;
   said receiver comprising a lowpass filter for producing a filtered, delayed recovered data signal;
   said receiver comprising a sampling comparator to digitize and retime said recovered data signal using said recovered clock signal;
   said lowpass filter comprising a variable delay for adjusting said digitized and retimed recovered data signal to a less than optimal delay value to introduce a controlled error rate;
   said receiver comprising a bit error rate subsystem for analyzing degraded signal errors produced by said sampling comparator and generating an audible signal that can be used by an individual to adjust a positioning of said pair of optical elements at said optical connection to maximize an efficiency of a signal transmitted through said optical elements.

23. The data link of claim 22, wherein said bit error rate subsystem is comprised of:
   a bit error rate detector for generating a narrow error pulse as said errors are detected; and
   a flip-flop that is toggled in response to receipt of each narrow error pulse for producing an electrical signal indicative of an alignment error between said optical elements.

24. The data link of claim 22, wherein said cables and said connectors are manipulated to locate a position at which said optical connection is maximized as indicated by said audible signal.

25. The data link of claim 22, wherein said cables and said connector are locked into said position.

26. The data link of claim 22, wherein said position is a point where cores of said optical elements are in co-axial alignment.

* * * * *